(12) United States Patent  
Bohnenstengel et al.

(10) Patent No.: US 11,767,922 B2  
(45) Date of Patent: Sep. 26, 2023

(54) MULTI-WAY VALVE FOR A CONTROL OF A REFRIGERANT CIRCUIT

(71) Applicant: OTTO EGELHOF GmbH & Co. KG, Fellbach (DE)

(72) Inventors: Peter Bohnenstengel, Esslingen (DE); Christian Dorn, Esslingen (DE); Andreas Ehmen, Wilhelmshaven (DE); Hans Köstler, Rudersberg (DE); Rainer Maurer, Backnang (DE); Volker Von Rad, Esslingen (DE); Kai Schauwecker, Fellbach (DE)

(73) Assignee: OTTO EGELHOF GmbH & Co. KG, Fellbach (DE)

(*) Notice: Subject to any disclaimer, the term of this patent is extended or adjusted under 35 U.S.C. 154(b) by 0 days.

(21) Appl. No.: 17/518,790

(22) Filed: Nov. 4, 2021

(65) Prior Publication Data

US 2022/0170559 A1   Jun. 2, 2022

(30) Foreign Application Priority Data

Nov. 27, 2020  (DE) .................. 10 2020 131 446.9

(51) Int. Cl.
*F16K 11/074* (2006.01)
*F16K 27/04* (2006.01)
(Continued)

(52) U.S. Cl.
CPC ............ *F16K 11/074* (2013.01); *F16K 11/22* (2013.01); *F16K 27/041* (2013.01);
(Continued)

(58) Field of Classification Search
CPC ........................................... F25B 41/26
See application file for complete search history.

(56) References Cited

U.S. PATENT DOCUMENTS

| 1,489,396 | A | | 4/1924 | Odum | |
|---|---|---|---|---|---|
| 4,286,624 | A | * | 9/1981 | Clausen | ............... F16K 11/207 137/255 |
| 2017/0254604 | A1 | * | 9/2017 | Sheppard | ............... F01P 11/08 |

FOREIGN PATENT DOCUMENTS

| DE | 102009036544 A1 | | 10/2011 | |
|---|---|---|---|---|
| DE | 202012102798 U1 | * | 9/2013 | .......... F16K 11/0856 |

(Continued)

OTHER PUBLICATIONS

Translation of DE 202012102798 (Year: 2022).*
European Search Report dated Apr. 4, 2022 in Corresponding European Application No. 21203742.

*Primary Examiner* — Craig M Schneider
*Assistant Examiner* — Christopher D Ballman
(74) *Attorney, Agent, or Firm* — KRIEGSMAN & KRIEGSMAN

(57) ABSTRACT

A multi-way valve for controlling a refrigerant circuit of a refrigeration system with a heat pump function, having a housing which has two mutually opposite end faces which each comprise an insertion opening to which a regulating chamber is connected, having multi-way valve arrangements which can each be inserted in the regulating chamber, the multi-way valve arrangement comprising at least one base body and a rotary slide valve arrangement, with in each case one connection in the housing, which open into the respective regulating chamber, and with at least further connections in the housing, which open into at least one channel which extends between the regulating chambers.

18 Claims, 5 Drawing Sheets

Figure 1:
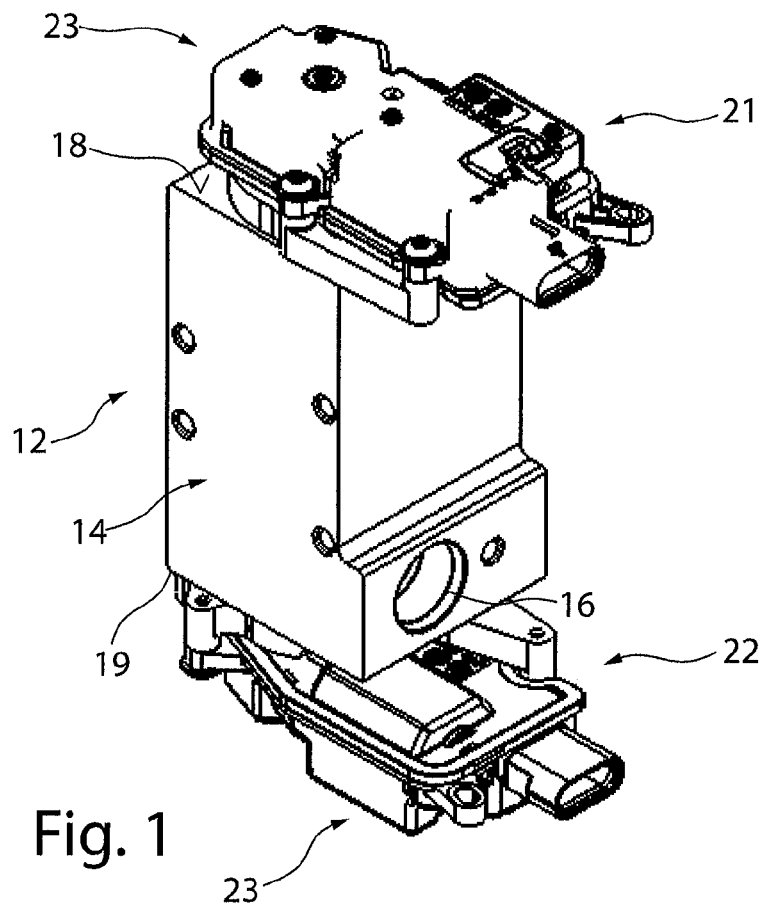

(51) Int. Cl.
*F16K 11/22* (2006.01)
*F16K 11/20* (2006.01)
*F25B 41/26* (2021.01)

(52) U.S. Cl.
CPC .......... *F16K 11/207* (2013.01); *F16K 27/045* (2013.01); *F25B 41/26* (2021.01)

(56) References Cited

FOREIGN PATENT DOCUMENTS

| DE | 102017102841 A1 | 8/2018 |
| JP | H06-194007 A | 7/1994 |
| JP | 2012-36933 A | 2/2012 |
| JP | 2013-15227 A | 1/2013 |
| JP | 6689418 B2 | 4/2020 |
| WO | 2019169650 A1 | 9/2019 |

* cited by examiner

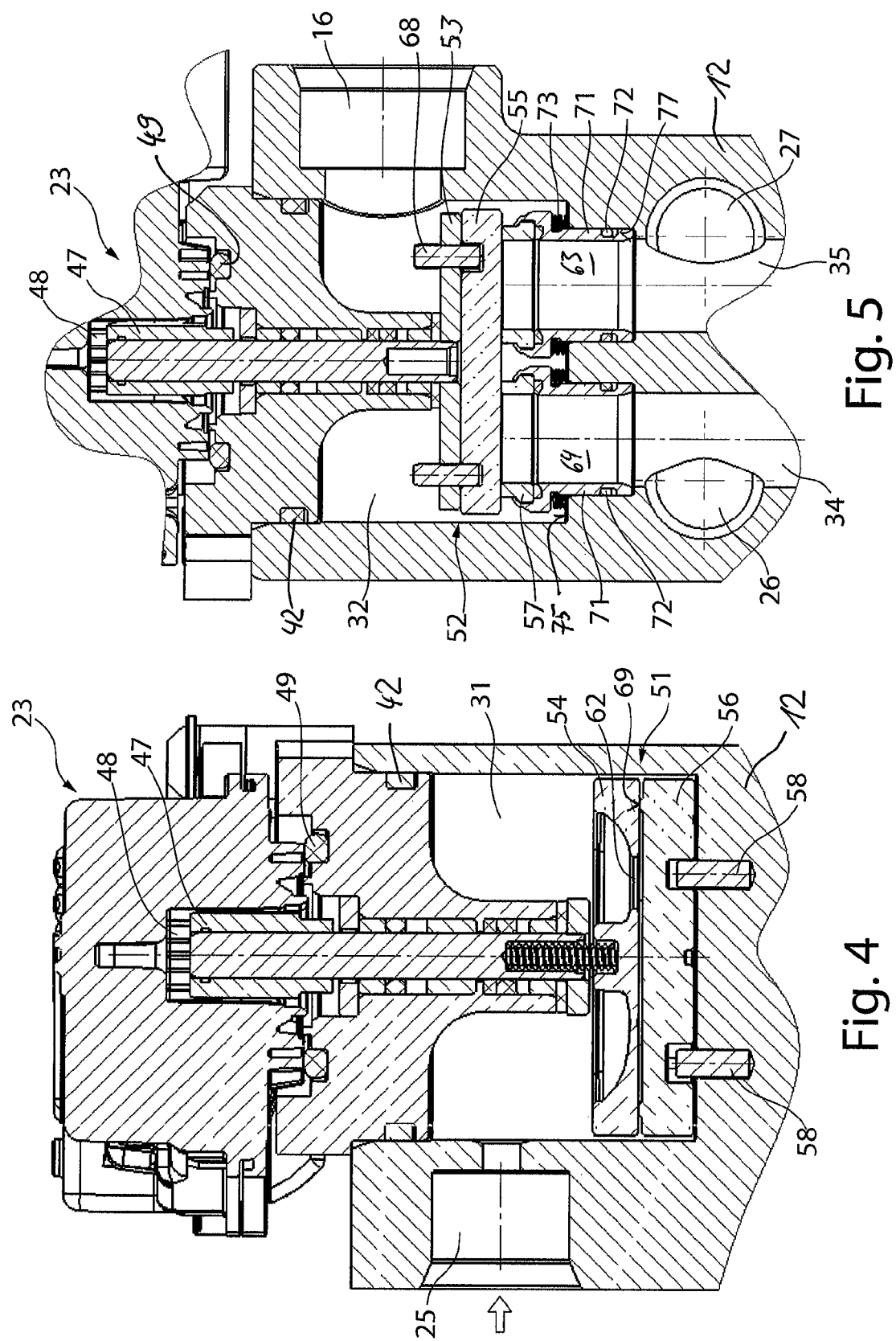

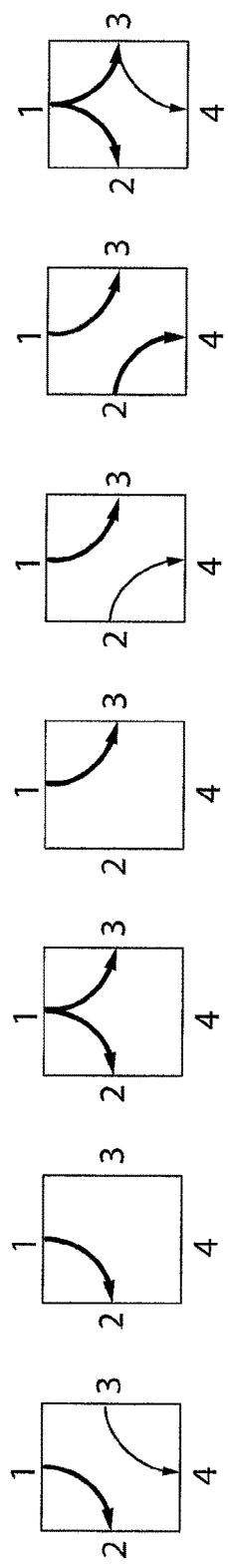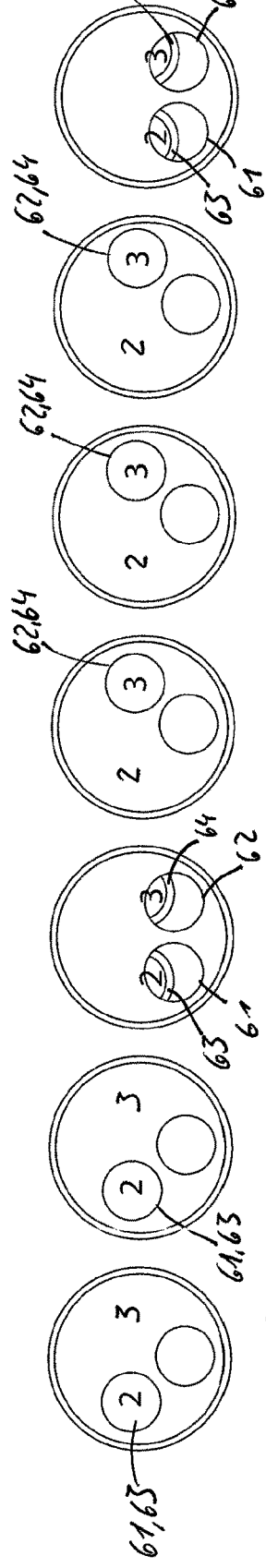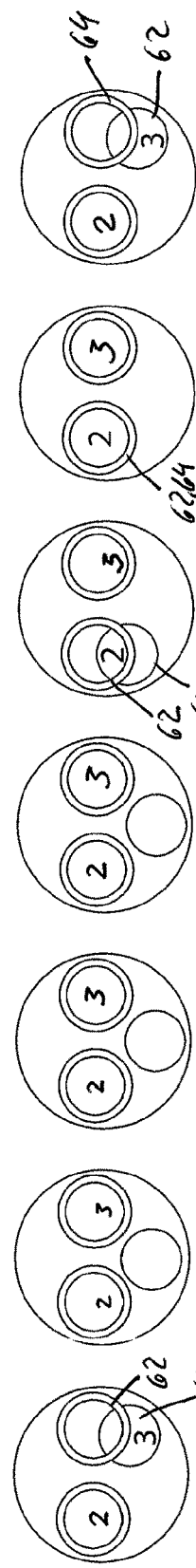

MULTI-WAY VALVE FOR A CONTROL OF A REFRIGERANT CIRCUIT

This application claims priority of German Application No. 10 2020 131 446.9 filed Nov. 27, 2020, which is hereby incorporated herein by reference in its entirety.

The invention relates to a multi-way valve for controlling a refrigerant circuit having a refrigeration system with a heat pump function.

From DE 10 2017 102 841 A1, a multi-way valve for controlling a refrigerant circuit is known. This multi-way valve comprises a housing in which a rotary slide valve arrangement is provided, which controls various switching positions via a shaft driven by a motor. The housing includes a first inlet opening which is connected to a regulating chamber by a first fluid channel. A second connection opening in the housing is connected to a second fluid channel to the regulating chamber. Third and fourth fluid passages lead from the regulating chamber to an outlet connection, respectively. A plurality of switching positions and a service position for controlling the refrigerant circuit can be controlled by such a multi-way valve. In this embodiment, the housing comprises a first housing half and a second housing half for positioning the rotary slide valve arrangement in the regulating chamber and for actuation by the shaft.

The invention is based on the object of proposing a multi-way valve which allows a simple construction and an individual control of several switching positions for a refrigerant circuit.

This object is solved by a multi-way valve for controlling the refrigerant circuit of the refrigeration system with heat pump function, which comprises a housing which has two mutually opposite end faces or two end faces assigned to each other which each comprise an insertion opening which is adjoined by a regulating chamber into which a respective multi-way valve arrangement is insertable which comprises at least one base body and a rotary slide valve arrangement. The housing has in each case a connection opening associated with the regulating chamber, and at least two further connection openings which are provided between the two rotary slide valve arrangements of the multi-way valve arrangements. This arrangement allows the housing to be formed in one piece. This exhibits a structurally simple design. Furthermore, this multi-way valve has the advantage that two multi-way valve arrangements are insertable opposite each other in the same housing. The design of the multi-way valve arrangements can be simplified, and yet it is possible that, for example, up to six switching positions and preferably one service position can be set and controlled.

Advantageously, two opposing regulating chambers in the housing of the multi-way valve are aligned in a common longitudinal axis. Each of the multi-way valve arrangements, which are insertable into the housing are preferably aligned mirror-inverted to each other. This can simplify the structure and, in particular, the arrangement of ducts between the two regulating chambers. Alternatively, it may be provided that the two longitudinal axes of the regulating chambers are aligned at an angle between 90° to 179°, preferably 135° to 179°, relative to each other.

Furthermore, each insertion opening in the housing is preferably closed by a respective base body of the multi-way valve arrangement. Thus, after insertion of this multi-way valve arrangement to the housing, a pressure-tight arrangement is created.

The rotary slide valve arrangements of the multi-way valve arrangements are preferably each driven by a shaft, and the shafts preferably lie on a common axis. This may allow a simplified construction of the multi-way valve. Furthermore, the opposing regulating chambers in the housing are preferably connected to two channels arranged coaxially with the longitudinal axis of the housing. These channels preferably extend between the two rotary slide valve arrangements arranged in the regulating chambers.

Furthermore, the at least one connection opening into the regulating chamber is preferably oriented tangentially to the regulating chamber. The connection is thus aligned decentrally to the regulating chamber. In this way, flow optimisation and a low pressure loss of the refrigerant can be achieved when the refrigerant flows into the regulating chamber of the multi-way valve.

According to a preferred embodiment of the housing for the multi-way valve, the at least one connection opening into the regulating chamber and the at least one connection provided between the two regulating chambers are aligned in the same direction on the housing. Thus, a simplified installation can be provided.

Preferably, the housing has, at least in sections, a rectangular cross-section and the at least one connection opening into the regulating chamber, wherein the connections provided between the two regulating chambers and opening into the channels are aligned with the same side face of the housing. Preferably, the at least one connection for the further regulating chamber is aligned with an adjacent or opposite side surface of the housing. This allows an improved installation situation and connection possibility to further components of the refrigerant circuit, such as a chiller in a battery cooling system or an evaporator for an air conditioning system.

Each multi-way valve arrangement of the multi-way valve preferably comprises an drive driving a shaft controlling the rotary slide valve arrangement. In this way, each multi-way valve arrangement can be controlled in the respective switching positions and preferably coordinated with one another.

Preferably, a common control is provided by which the two multi-way valve arrangements can be controlled. By combining the individual switching positions of each multi-way valve arrangement, a large number of switching positions can be controlled with a structurally simple design of the rotary slide valve arrangement.

The drives of the multi-way valve arrangements are preferably formed as flat rectangular housings. A longitudinal axis of the housing is oriented differently from the side surface of the housing having the plurality of connections. This allows for connection optimization.

Preferably, at least one side surface of the housing is free of connectors. This may provide a mounting interface.

In the case of the multi-way valve, the one connection opening to the regulating chamber is preferably controllable as an inlet for the refrigerant in all adjustable switching positions and preferably the first multi-way valve arrangement is arranged towards the high-pressure side of the housing. The first multi-way valve arrangement is preferably designed to suit the pressure conditions prevailing in the regulating chamber.

The second multi-way valve arrangement opposite the first multi-way valve arrangement is preferably arranged on a low-pressure side of the housing. Since the flow conditions on the low-pressure side of the housing are different from those on the high-pressure side, the rotary slide valve arrangement of the second multi-way valve arrangement can be adapted accordingly.

To simplify the structure of the multi-way valve, the first and second multi-way valve arrangements preferably have a connection point for the drive and preferably the same drive. In particular, the base body of the two multi-way valve arrangements can also be of the same design.

Furthermore, the first and second multi-way valve arrangements preferably comprise a driver between the base body and the rotary slide valve arrangement, which driver is rotatably controlled by the shaft and rotatably controls a respective control disc of the rotary slide valve arrangement. Thus, the principle structure of such a rotary slide valve arrangement can be maintained for both multi-way valve arrangements. In particular, the control discs of the rotary slide valve arrangement are matched to each other so that they can lie sealingly against each other in different switching positions without additional seals.

According to a further preferred embodiment, it is provided that the first multi-way valve arrangement is insertable in the regulating chamber and the connection formed as an inlet is pressurizable and the refrigerant is transferred into the one channel or the other channel or proportionally into the two channels and this rotary slide valve arrangement of the first multi-way valve arrangement is formed by a rotatable rotary slide valve and a stationary rotary slide support which is preferably positioned in contact with the bottom of the regulating chamber under pressure.

With respect to the rotary slide valve arrangement, the second multi-way valve arrangement is preferably constructed differently from the rotary slide valve arrangement of the first multi-way valve arrangement.

This has for adaptation to pressure gradients and a direction of flow, since first the rotary slide support is acted upon. In this second multi-way valve arrangement, the pressure acts in the opposite direction to the first multi-way valve arrangement.

Preferably, in the second multi-way valve arrangement, the rotary slide support has two connecting bushings which are insertable into sections of the ducts and are each sealed by seals. Preferably, the end faces of the connecting bushings facing the ducts are provided with insertion chamfers. This makes it possible to optimise the flow on the one hand and reduce surface pressure due to the pressure of the refrigerant on the end faces of the connecting bushes on the other.

Advantageously, the above-described embodiment of the multi-way valve can be used to control up to six different switching positions and preferably one switching position for service operation of the refrigerant circuit. In this context, six switching positions are to be understood in the sense that the connections are connected to one another in a different manner, with settings still being possible in between with regard to the individual flow volumes.

Figure 2:
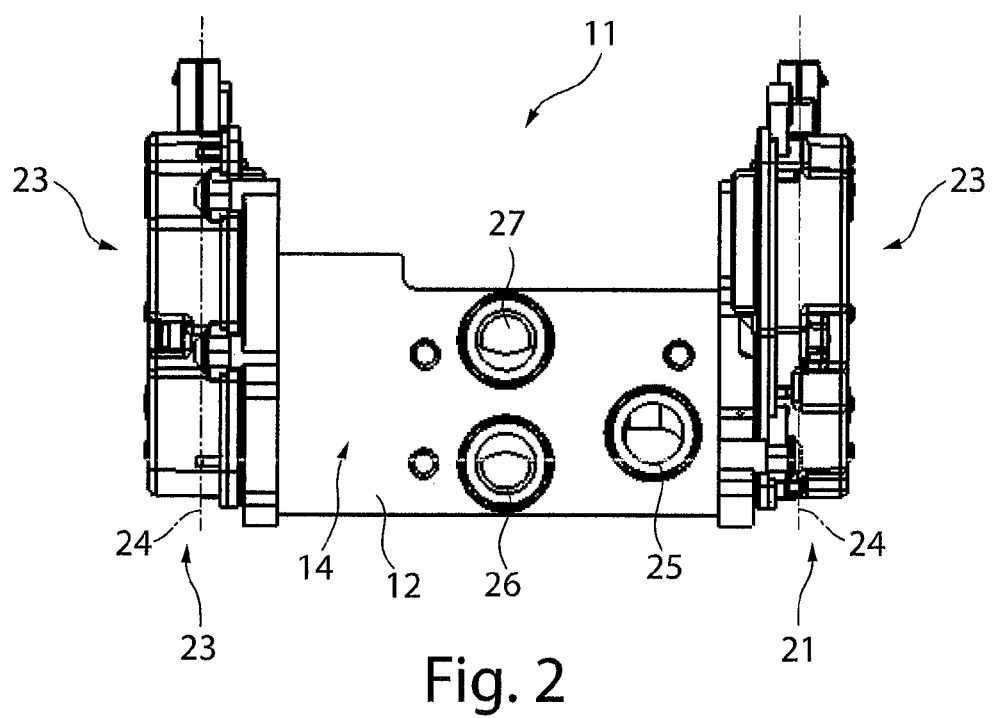
Figure 3:
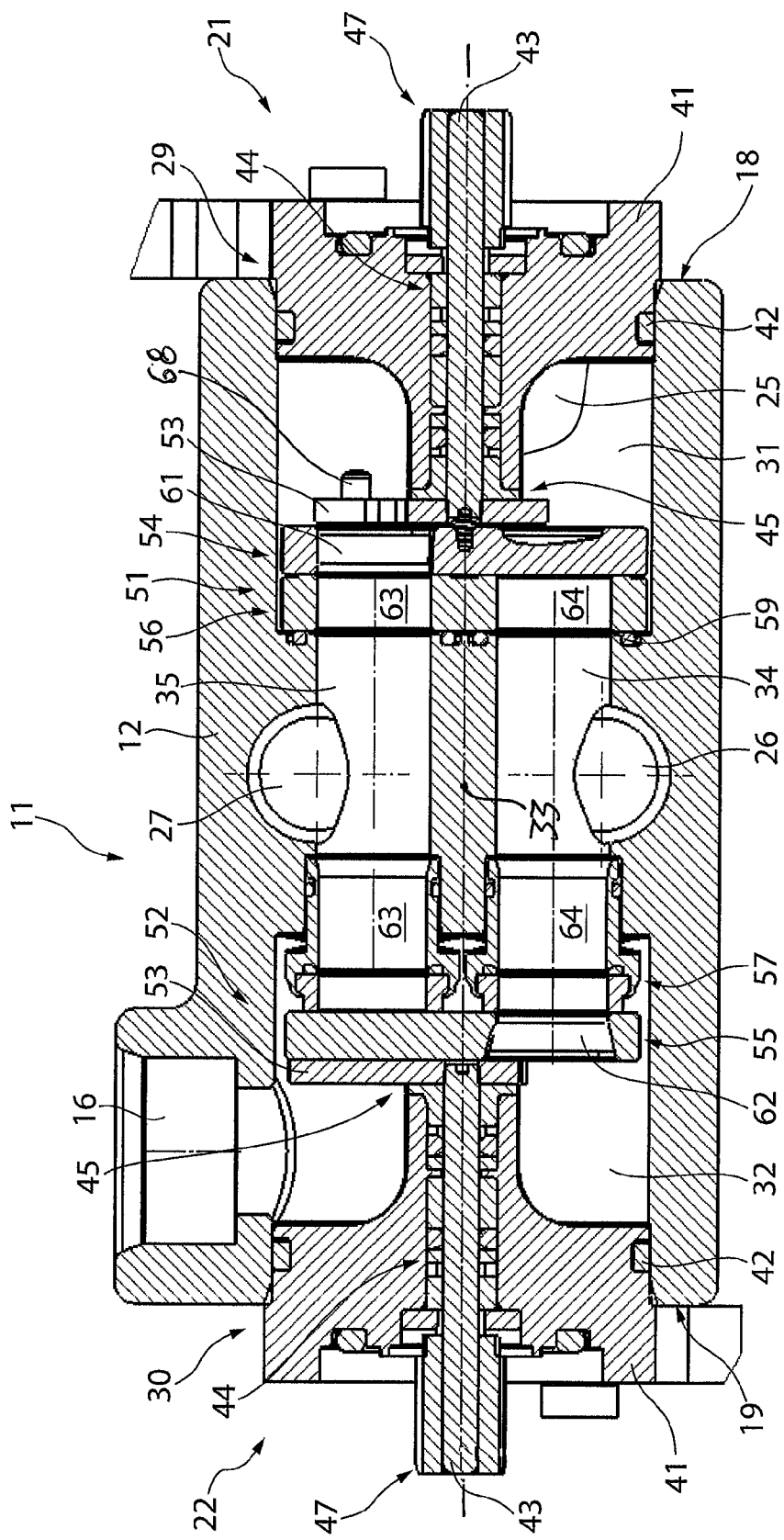
Figure 6:
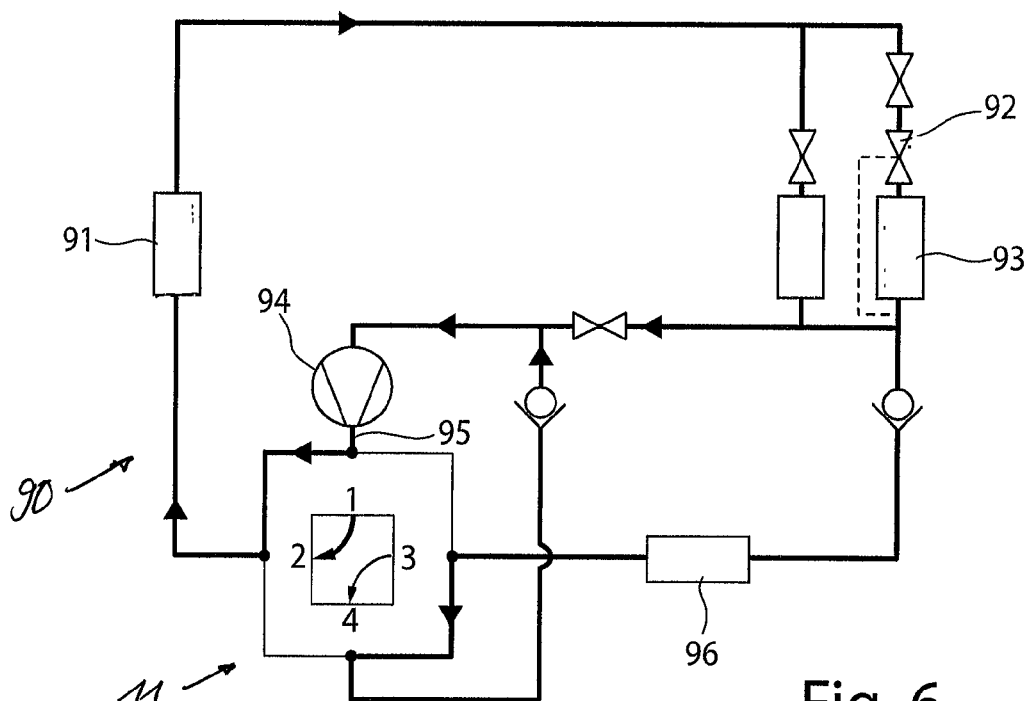
Figure 13:
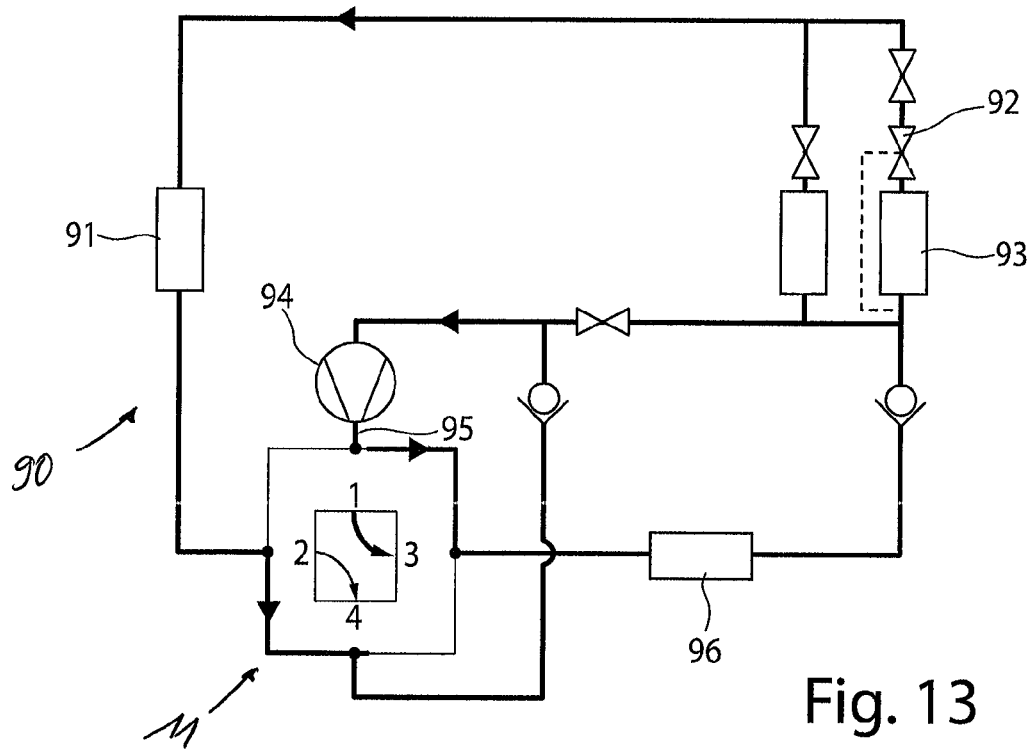

The invention and further advantageous embodiments and further embodiments thereof are described and explained in more detail below with reference to the examples shown in the drawings. The features to be taken from the description and the drawings can be applied individually or in any combination in accordance with the invention. It is shown:

FIG. 1 a perspective view of a multi-way valve,
FIG. 2 a schematic side view of the multi-way valve according to FIG. 1,
FIG. 3 a schematic longitudinal cross section of the multi-way valve according to FIG. 1, FIG. 4 a schematic enlarged view of a first multi-way valve arrangement of the multi-way valve,
FIG. 5 a schematic enlarged cross sectional view of a second multi-way valve arrangement of the multi-way valve,
FIG. 6 a schematic arrangement of a refrigerant circuit showing a first switching position of the multi-way valve according to FIG. 1,
FIGS. 7a-7c a schematic view of the switching position of the multi-way valve and views of the rotary slide valve arrangements of the multi-way valve arrangements in the switching position of the multi-way valve according to FIG. 6,
FIGS. 8a-8c a schematic view of a switching position of the multi-way valve and the views of the rotary slide valve arrangements of the multi-way valve arrangements in the flow direction of the refrigerant,
FIGS. 9a-9c a schematic view of a switching position of the multi-way valve and views of the rotary slide valve arrangements in the direction of flow of the refrigerant,
FIGS. 10a-10c a schematic view of a switching position of the multi-way valve and views of the rotary slide valve arrangements in the direction of refrigerant flow,
FIGS. 11a-11c a schematic view of a switching position of the multi-way valve and views of the rotary slide valve arrangements in the direction of refrigerant flow,
FIGS. 12a-12c a schematic view of a switching position of the multi-way valve and views of the rotary slide valve arrangements in the direction of refrigerant flow,
FIG. 13 a schematic arrangement of the refrigerant circuit with a further switching position of the multi-way valve, and
FIGS. 14a-14c a schematic view of a switching position of the multi-way valve and views of the rotary slide valve arrangements in the direction of refrigerant flow.

FIG. 1 shows a perspective view of a multi-way valve 11. This multi-way valve 11 is used to control a refrigerant circuit 12 (FIGS. 6 and 13) of a refrigeration system with heat pump function.

This multi-way valve 11 comprises a housing 12 which has, for example, a rectangular cross-section. This housing 12 has a mounting interface 14 on one end face, in which holes are provided for attaching fastening elements, for example. On another side face, a connection 16 for a refrigerant supply or discharge is provided. On one end face 18 and an opposite end face 19 of the housing 12, a first multi-way valve arrangement 21 and, opposite thereto, a second multi-way valve arrangement 22 are arranged. Only one drive 23 is seen on each of these multi-way valve arrangements 21, 22. In the following, the multi-way valve arrangements 21, 22 will be described in more detail in the sectional views according to FIGS. 3 to 5:

In a side view of the multi-way valve 11 according to FIG. 2, for example, three further connections 25, 26, 27 are provided in a further side surface of the housing 12. These connections 25, 26, 27 are provided on a side surface which is preferably aligned parallel to a longitudinal axis 24 of the drives 23.

According to another preferred embodiment of the multi-way valve 11, it may be provided that all connections 16, 25, 26, 27 are arranged on one side surface of the housing 12. Also, alternatively, a connection 16, 25, 26, 27 may be provided on each side surface of the housing. The number of connections per side surface 12 of the housing and their orientation may be adapted to the installation situation.

FIG. 3 shows a longitudinal cross section of the multi-way valve 11 as shown in FIG. 1. The respective drives 23 of the first multi-way valve arrangement 21 and second multi-way valve arrangement 22 are only partially shown.

This longitudinal section shows that the housing 12 for the multi-way valve 11 is preferably formed in one piece. An insertion opening 29, 30 is provided at each of the end faces 18, 19, to each of which a regulating chamber 31, 32 adjoins. The first connection 25 is associated with the regulating chamber 31. Two channels 34, 35 are provided between the two regulating chambers 31, 32, one channel 34 being connected to the connection 26 and the other channel 35 being connected to the connection 27. The second regulating chamber 32, which is opposite the first regulating chamber 31, is connected to the connection 16.

This multi-way valve 11 accommodates the first multi-way valve arrangement 21 and the second multi-way valve arrangement 22 opposite each other in the housing 12. These can each be inserted into the corresponding regulating chamber 31, 32 via the insertion openings 29, 30 and are fixed therein via detachable fixing means not shown in greater detail. The multi-way valve arrangements 21, 22 have an analogous structure. These comprise a base body 41 which is insertable into the insertion opening 29, 30. At least one seal 42 is provided on the outer periphery of the base body to seal this regulating chamber 31, 32 from the outside. In the base body 41, a shaft 43 is rotatably guided by a shaft bearing 45. In addition, a seal is provided with respect to the regulating chamber by a shaft seal 44 which is arranged between the shaft 43 and the base body 41. A toothed pinion 47 is provided at a front end of the shaft 43, which is drive-connected to a complementary drive element 48 of the drive 23 (FIG. 4 and FIG. 5).

At least one seal 49 (FIG. 4 and FIG. 5) can also be provided between the base body 41 and the drive 23 or its housing.

Opposite the drive 23, the shaft 43 is connected to a rotary slide valve arrangement 51, 52. The rotary slide valve arrangement 51 of the first multi-way valve arrangement 21 preferably differs from the rotary slide valve arrangement 52 of the second multi-way valve arrangement 22, and will be described in further detail below in FIGS. 4 and 5.

A driver 53 is provided between the rotary slide valve arrangement 51, 52 and the shaft 44, which driver 53 is fixedly connected to the shaft 43 and controls a rotary movement of a rotary slide valve 54, 55 relative to a rotary slide support 56, 57 of the rotary slide valve arrangement 52, 53. The shaft 43 is welded, in particular laser welded, or soldered, pressed or riveted to the driver 54, for example.

The connection 25 is formed as an inlet for a refrigerant. Thus, high pressure is present in this first regulating chamber 31. The first multi-way valve arrangement 21 is provided on the high pressure side in the regulating chamber 31 and is formed accordingly.

The connections 26, 27 are provided on the low pressure side. Furthermore, the second multi-way valve arrangement 22 is arranged in the second regulating chamber 32 on the low pressure side. The connection 16 is configured as an outlet. The connections 26, 27 opening to the ducts 34, 35 can be controlled as an inlet or as an outlet, and regardless of the control, these are pressurized on the low pressure side.

The inlet 25 from the housing 12 into the regulating chamber 31 and the connection 16 from the second regulating chamber 32 out of the housing 12 are preferably provided off-centre with respect to the longitudinal axis of the respective multi-way valve arrangement 21, 22. These open off-centre into the regulating chambers 31, 32 and feed the refrigerant to a rounded section of the base body 41. This enables a flow-optimized supply and/or discharge of the refrigerant. Furthermore, the leading edge of the connection 25 into the regulating chamber 31 as well as an edge between the regulating chamber 32 and the outlet 16 has an internal chamfer, thereby enabling a reduction of the pressure drop between the connection 25 to the regulating chamber 31 and/or from the regulating chamber 32 to the connection 16. The connections 26, 27 are also positioned off-centre with respect to the channels 34, 35.

The regulating chambers 31, 32 are opposite each other and aligned in such a way that after insertion of the first and second multi-way valve arrangements 21, 22 the longitudinal axes of the shafts 43 preferably lie along a common longitudinal axis. The channels 34, 35 are aligned coaxially with the longitudinal axis of the housing 12 and the longitudinal axis of the shafts 43 respectively. Alternatively, it may be envisaged that the longitudinal axes of the shafts 43 may also be aligned parallel to each other in a common housing 12. It is also possible that the longitudinal axes of the two shafts 43 of the multi-way valve arrangement 21, 22 are arranged at an angle <180° in a common housing 12. Depending on the installation arrangement, an alignment of the regulating chambers 31, 32 at an angle of 90° or an angle of 90° to 180° may also be provided, with the channels 34, 35 having correspondingly flow-favourable geometries.

The rotary slide valve arrangements 51, 52 each comprise a first rotatable rotary slide valve 54, 55 which comprise, for example, two through openings 61, 62. These rotary slide valves 54, 55 are associated with rotary slide supports 56, 57. These also preferably each comprise two through openings 63, 64. By a corresponding overlap or offset of the first rotary slide valve 54, 55 with respect to the rotary slide support 56, 57, the corresponding passage openings can be blocked and completely unblocked as well as individually or both partially opened. This is described in the following FIGS. 7 to 12 and 14. The respective through openings 63, 64 in the rotary slide support 56, 57 are aligned with the channels 34, 35.

The rotary slide valve 54, 55 and the rotary slide support 56, 57 are preferably formed of ceramic. They can also be made of plastic or metal.

By this embodiment of the multi-way valve 11, for example, the refrigerant entering through the connection 25 formed as an inlet is supplied by the first multi-way valve arrangement 21 either only to the channel 34 or only to the channel 35 or both channels 34, 35 are each supplied with refrigerant proportionally. Depending on the switching position of the second rotary slide valve arrangement 52 of the second multi-way valve arrangement 21, for example, a refrigerant present in the channel 34 can flow out via the connection 26 formed as an outlet. Similarly, refrigerant provided in the channel 35 may be discharged via the connection 27. Also, a switching position can be adopted so that the connection 16 configured as an outlet discharges the refrigerant.

FIG. 4 shows a schematic enlargement of the first multi-way valve arrangement 21 in a further sectional view of FIG. 3. The sectional view shown in FIG. 4 is rotated by 90° to that in FIG. 3. From this sectional view it can be seen that this rotary slide support 56 is mounted in a rotationally fixed manner to the housing 12 by means of pins 58. Alternatively, it may be provided that the rotary slide support 56 is held fixed to the housing 12 by a screw connection. For the sealing arrangement of the rotary slide support 56 with respect to the housing 12, a seal 59 can be provided, as shown in FIG. 3, so that for each passage opening 63, 64 a seal 59 is provided for the sealing arrangement between the housing 12 and the rotary slide support 56.

The rotary slide valve 54 has cup-shaped recesses, starting from an upper side viewed in the direction of the rotary slide support 56, which merge into the through openings 61, 62. This may provide a streamlined arrangement.

The driver 53 is preferably fixed against rotation with respect to the rotatable rotary slide valve 54 by at least one, in particular two, pins 68 (FIG. 3). Preferably, a sliding surface 69 is provided between the rotatable rotary slide valve 54 and the rotary slide support 56, which is raised relative to an end face of the rotary slide support 56. As a result, a facilitated rotational movement of the rotary slide valve 54 towards the rotary slide support 56 can take place. At the same time, a sealing surface may be formed by this raised sliding surface 59 which extends around the through bore 63, 64. In addition, individual segment-shaped sliding surfaces 69 can be formed as support surfaces.

FIG. 5 shows a schematically enlarged sectional view of the second multi-way valve arrangement 22. This sectional view is also rotated 90° from the sectional view in FIG. 3. Through this sectional view, it is apparent that the driver 53 engages and is rotationally connected to the rotatable rotary slide valve 55 via pins 68. For example, the pin 68, particularly a dowel pin, may be press-fitted into the follower 53 and engage a recess in the rotatable rotary slide valve 55. Preferably, an interference fit is provided between pin 68 and the rotary slide valve 55. Preferably, the pins 68 are press-fitted with a plastic sleeve into bores in the rotary slide valve 55 for torque transmission without transverse forces. This connection between the driver 18 and the rotary slide valve 55 can also be provided in the rotary slide valve arrangement 51 according to FIG. 4.

The rotary slide valve arrangement 52 arranged in the second regulating chamber 32 is designed differently from the rotary slide valve arrangement 51 due to the prevailing pressure conditions. Low pressure is present in the regulating chamber 32. In the channels 34, 35 the refrigerant is still at high pressure. In order to enable a sealing arrangement between the rotary slide support 57 of the second rotary slide valve arrangement 52 and the regulating chamber 32, it is provided that a plugin bushing 71 is inserted in each of the ducts 34 and 35. This is sealed to the outside of the channel 34, 35 by means of a seal 72. This insert bushing 71 is positioned so as to be displaceable in an axial direction relative to the longitudinal axis of the ducts 34, 35. Preferably, a spring element 73 is positioned between a shoulder 74 of the insertion bushing 71 and a bottom 75 of the regulating chamber 32. As a result, the insert bushing 71 is urged towards the rotary slide valve arrangement 52. On the inlet side, as viewed in the direction of flow, the insert bushing 71 may have a slope 77 to form a streamlined arrangement. Oppositely, the insert bushing 71 may include an abutment surface or receptacle to abut and/or engage the rotary slide support 57. The rotary slide support 57 may be formed by two annular bodies received and retained on the insert bushing 71. These may, in turn, engage the rotatable rotary slide valve 55 by means of a sliding surface 69.

FIG. 6 shows an exemplary structure of the refrigerant circuit 90. This refrigerant circuit 90 is operated in cooling mode. This refrigerant circuit 90 comprises, described in the direction of flow, a condenser 91 which supplies the refrigerant under high pressure to an expansion valve 92. On the low pressure side of the expansion valve 92, an evaporator 93 is provided which supplies the expanded refrigerant to a compressor 94. On the outlet side of the compressor 94, a fluid line 95 is provided which leads directly to the connection 25 of the housing 12 of the multi-way valve 11. Due to the switching position of the first multi-way valve arrangement 21 shown in FIG. 3, the refrigerant flows into the channel 35 and subsequently to the connection 27, so that the refrigerant is supplied to the condenser 91. Due to the switching position of the second multi-way valve arrangement 22, a refrigerant accumulated inside the condenser 96 can be extracted so that it is supplied to the channel 34 via the connection 26 and from there is transferred to the regulating chamber 32 via the second rotary slide valve arrangement 52 so that it is again supplied to the refrigerant circuit 90 via the connection 16.

FIG. 7a shows a schematic representation of this switching position as shown in FIG. 6. FIG. 7b shows a view of the first rotary slide valve arrangement 51 as seen in the direction of flow. From this it is obvious that the passage openings 61 and 63 form a common passage, whereas the second passage openings 62 and 64 do not overlap and block this passage. FIG. 7c shows a view of the second rotary slide valve arrangement 52 as seen in the direction of flow. The passage opening 62 of the rotatable rotary slide valve 55 only partially clears the passage opening 64 of the rotary slide support 57, whereby a reduced refrigerant flow reaches the connection 16. The other through openings 61, 63 are blocked.

FIG. 8a shows another switching position of the multi-way valve 11. This switching position can control a pure cooling mode. Here, according to FIG. 8b, it is provided that the first rotary slide valve arrangement 51 releases one passage to connection 27 and blocks the further passage to connection 26. FIG. 8c shows the switching position of the second rotary slide valve arrangement 52, which blocks a passage of the channels 34 and 35 into the regulating chamber 32.

FIG. 9a shows another switching position of the multi-way valve 11. This can be a transition from a cooling mode to a heat pump mode. FIG. 9b shows the switching position of the first rotary slide valve arrangement 51. The two through-holes 61, 62 of the rotatable rotary slide valve 54 only partially cover the through-holes 63, 64 of the rotary slide support 56, so that refrigerant flows from the regulating chamber 31 into the channels 34, 35. Since, according to the switching position of the second rotary slide valve arrangement 52 shown in FIG. 9c, a flow into the further regulating chamber 32 is blocked, the refrigerant opening into the channels 34, 35 flows off completely into the connections 26, 27.

FIG. 10a shows another possible switching position of the multi-way valve 11. The first rotary slide valve arrangement 51 according to FIG. 10b is controlled in such a way that the passages 62, 64 are open and the refrigerant is transferred into the channel 34 to the connection 26.

The passage to connection 27 is blocked. In FIG. 10c, the second rotary slide valve arrangement 52 is provided in a blocked position.

FIG. 11a shows another possible switching position of the multi-way valve 11. Here it can be a heat pump mode, in particular a heating with simultaneous extraction of the cooling circuit. In this case, the first rotary slide valve arrangement 51 as shown in FIG. 11b is arranged as shown in FIG. 10b. For the simultaneous extraction of the cooling circuit, the second rotary slide valve arrangement 52 is moved into a switching position as shown in FIG. 11c, in which the passage opening 61, 63 is only partially open.

In contrast to FIG. 11a, FIG. 12a shows that a flow rate of the refrigerant from the connection 26 to the connection 16 is increased. This is shown by a comparison of FIGS. 11c and 12c, which show that the through openings 61, 63 of the second rotary slide valve arrangement 52 are congruent and thus a maximum opening is released.

This switching position of the multi-way valve 11 shown in FIG. 12 controls the refrigerant circuit 90 as shown in FIG. 13 in the heating mode, as indicated by the flow arrows.

FIG. 14*a* shows another possible switching position of the multi-way valve 11. This switching position is a so-called service position in which, for example, evacuation of the refrigerant circuit 90 and subsequent filling with refrigerant is possible. In this switching position, it is provided that the first rotary slide valve arrangement 51 is partially open with respect to the passage openings 61, 63 as well as 62, 64, so that the channels 34, 35 are filled and the refrigerant can flow out via the connections 26, 27. Furthermore, the second rotary slide valve arrangement 52 is partially open so as to allow refrigerant to flow into the second regulating chamber 32 which flows out via the connection 16.

Further switching positions to the switching positions described above are also possible. Such intermediate positions can be used to change and control the amount of individual volume flows.

The invention claimed is:

1. A multi-way valve for controlling a refrigerant circuit of a refrigeration system with a heat pump function,
    having a housing which has two end faces mutually opposite or assigned to each other wherein each end face of the housing comprises an insertion opening and a first insertion opening is adjoined by a first regulating chamber and a second insertion opening is adjoined to a second regulating chamber,
    with a first multi-way valve arrangement which is insertable in the first regulating chamber and a second multi-way valve arrangement which is insertable in the second regulating chamber, wherein each of the first and the second multi-way valve arrangements comprises at least one base body and a rotary slide valve arrangement,
    with a respective connection in the housing that opens into the respective regulating chamber, and
    with at least further connections in the housing,
    wherein at least one first connection opens into a first channel extending between the regulating chambers and at least one second connection opens into a second channel extending between the regulating chambers in which the rotary slide valve arrangements are positioned, and
    wherein the rotary slide valve arrangement of the first multi-way valve arrangement is formed by a first rotatable rotary slide valve and a rotary slide support which is inserted in the first regulating chamber, and
    wherein the rotary slide valve arrangement of the second multi-way valve arrangement is constructed differently from the rotary slide valve arrangement of the first multi-way valve arrangement.

2. The multi-way valve according to claim 1, wherein the housing comprises two regulating chambers aligned at an angle between 90° and 179° to each other or aligned with a longitudinal axis of the housing.

3. The multi-way valve according to claim 1, wherein the insertion openings in the housing are each closed by the base body of each multi-way valve arrangement.

4. The multi-way valve according to claim 1, wherein the rotary slide valve arrangements are each driven by a respective shaft and the shafts of the multi-way valve arrangements arranged relative to each other in the housing lie along a common longitudinal axis.

5. The multi-way valve according to claim 1, wherein the opposing first regulating chamber and the second regulating chamber are connected to two channels arranged coaxially to the longitudinal axis of the housing and extending between the two rotary slide valve arrangements of the multi-way valve arrangements.

6. The multi-way valve according to claim 1, wherein each respective connection opening into the regulating chamber is oriented tangentially to the respective regulating chamber.

7. The multi-way valve according to claim 1, wherein the respective connection opening into the regulating chamber and the at least one connection provided between the two rotary slide valve arrangements of the multi-way valve arrangements are aligned in the same direction on the housing.

8. The multi-way valve according to claim 1, wherein the housing has, at least in sections, a rectangular cross-section and the respective connection lying in the regulating chamber and the further connections opening into the channels are aligned with a same side face of the housing and at least one further connection of a further regulating chamber is aligned with an adjacent or opposite side face of the housing.

9. The multi-way valve according to claim 1, wherein each multi-way valve arrangement comprises a drive that drives a shaft connected to the rotary slide valve arrangement.

10. The multi-way valve according to claim 9, wherein the drive of the multi-way valve arrangements comprises a flat rectangular housing and a longitudinal axis of the housings of the drives is oriented differently from the lateral side of the housing on which the plurality of connections is provided.

11. The multi-way valve according to claim 1, wherein the first and second multi-way valve arrangements are drivable by a common control.

12. The multi-way valve according to claim 1, wherein, a side surface of the housing is free of connections and forms an arrangement interface.

13. The multi-way valve according to claim 1, wherein the at least one first connection leading to the first regulating chamber is arranged as an inlet for the refrigerant and the first multi-way valve arrangement is arranged on a high pressure side of the housing in all switching positions of the rotary slide valve arrangements and the second multi-way valve arrangement opposite the first multi-way valve arrangement is arranged on a low pressure side of the housing.

14. The multi-way valve according to claim 1, wherein the first and second multi-way valve arrangements have the same base body and connection interface for a same drive.

15. The multi-way valve according to claim 1, wherein the first and second multi-way valve arrangements comprise, between the base body and the rotary slide valve arrangement, a driver rotatably driven by a shaft and rotatably driving a respective rotary slide valve of the rotary slide valve arrangements.

16. The multi-way valve according to claim 1, wherein the rotary slide support of the rotary slide valve arrangement of the first multi-way valve arrangement is held in abutment against the base of the regulating chamber under pressure of the refrigerant.

17. A multi-way valve for controlling a refrigerant circuit of a refrigeration system with a heat pump function,
    having a housing which has two end faces mutually opposite or assigned to each other wherein each end face of the housing comprises an insertion opening and a first insertion opening is adjoined by a first regulating chamber and a second insertion opening is adjoined to a second regulating chamber, with a first multi-way valve arrangement which is insertable from the outside through the first insertion opening in the first regulating chamber and a second multi-way valve arrangement which is insertable from the outside through the second insertion opening in the second regulating chamber, wherein each of the first and the second multi-way valve arrangements comprises at least one base body and a rotary slide valve arrangement, with a respective connection in the housing that opens into the respective regulating chamber, and with at least further connections in the housing, wherein at least one first connection opens into a first channel extending between the regulating chambers and at least one second connection opens into a second channel extending between the regulating chambers in which the rotary slide valve arrangements are positioned, wherein the first multi-way valve arrangement is insertable into the first regulating chamber and the first connection designed as an inlet, is pressurizable and the refrigerant is transferred into one or both channels, wherein the rotary slide valve arrangement of the second multi-way valve arrangement has a rotary slide valve and a rotary slide support and is configured for a flow direction of the refrigerant from the first regulation chamber to the second regulating chamber which are connected by two channels in between.

18. A multi-way valve for controlling a refrigerant circuit of a refrigeration system with a heat pump function, having a housing which has two end faces mutually opposite or assigned to each other wherein each end face of the housing comprises an insertion opening and a first insertion opening is adjoined by a first regulating chamber and a second insertion opening is adjoined by a second regulating chamber, with a first multi-way valve arrangement which is insertable through the first insertion opening in the first regulating chamber and a second multi-way valve arrangement which is insertable through the second insertion opening in the second regulating chamber, wherein each of the first and second multi-way valve arrangement comprises at least one base body and a rotary slide valve arrangement, wherein the rotary slide valve arrangement of the second multi-way valve arrangement is constructed differently compared to the rotary slide valve arrangement of the first multi-way valve arrangement, with a respective connection in the housing that open into the respective regulating chamber, and with at least further connections in the housing, which open into at least one channel extending between the regulating chambers, wherein a rotary slide support of a rotary slide valve arrangement of the second multi-way valve arrangement comprises two connecting bushings which are at least partially insertable into the channels and are guided in a longitudinally displaceable manner in the channels and are each sealed off from the channels by seals.

* * * * *